Oct. 9, 1923.
W. F. SCHMEISKE
FLOWER HOLDER
Filed Nov. 15, 1922
1,469,823
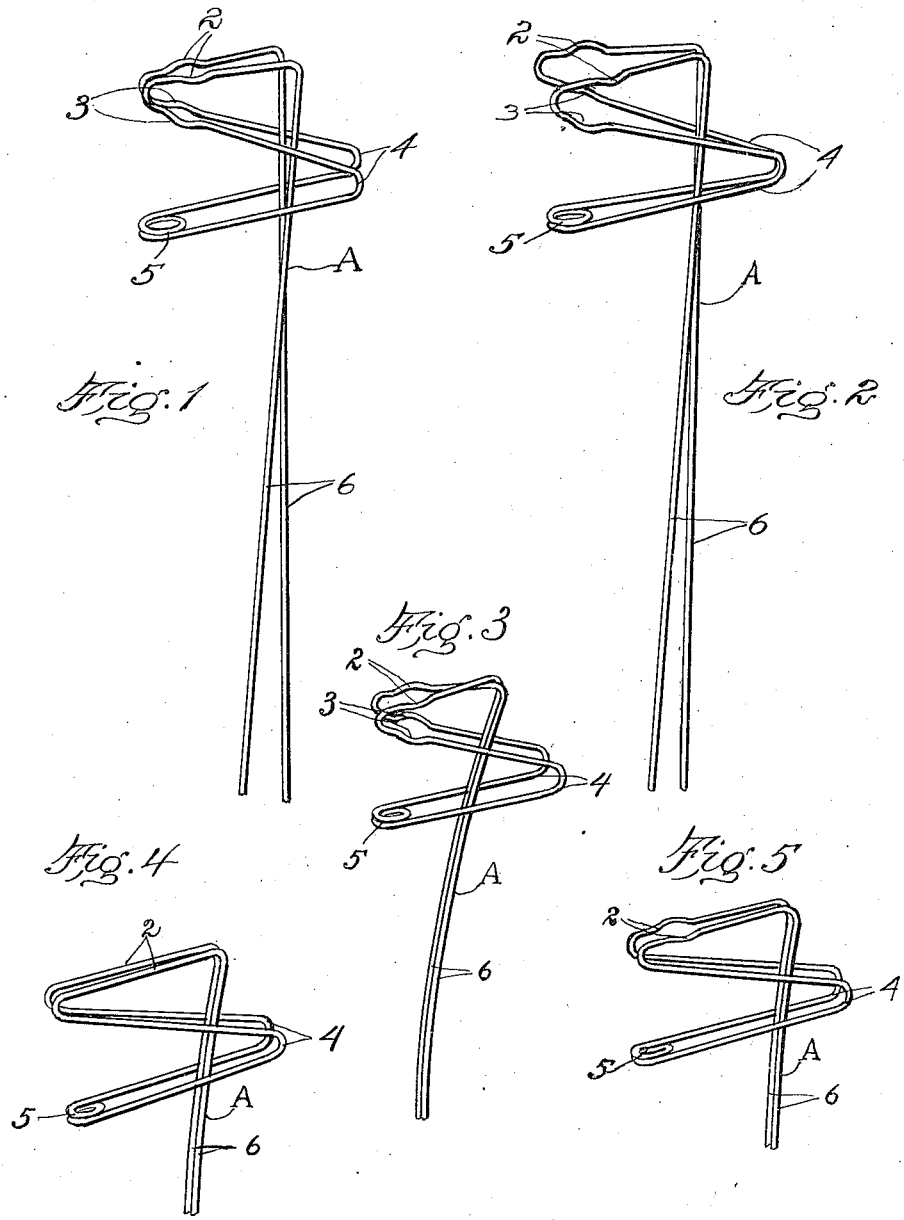
INVENTOR
William F. Schmeiske
BY ATTORNEY Patented Oct. 9, 1923.

1,469,823

UNITED STATES PATENT OFFICE.

WILLIAM F. SCHMEISKE, OF BINGHAMTON, NEW YORK.

FLOWER HOLDER.

Application filed November 15, 1922. Serial No. 601,142.

*To all whom it may concern:*

Be it known that I, WILLIAM F. SCHMEISKE, a citizen of the United States, residing at Binghamton, in the county of Broome and State of New York, have invented certain new and useful Improvements in Flower Holders, of which the following is a specification.

My invention relates to a flower holder and more particularly to a device of the character described which is mounted in funeral pieces for decorative purposes and in like floral displays; also it has the further object to provide a novel device of the character described, easily manufactured and which will permit of the secure holding of the flower stem in vertical position and readily grasping the stem and permitting easy removal thereof. One of the features of the invention is the provision of a flower holder having spring jaws and a recess therein for clamping the flower stems, and ear projections for grasping between the fingers for readily opening the jaws, all of which parts being constructed from a single length of spring steel wire.

With these and other objects in view my invention consists in the following novel features of construction and arrangement of parts as will be hereinafter more fully described and pointed out in the claim, reference being had to the accompanying drawings, in which:

Fig. 1 is a perspective view of my device with the jaws closed.

Fig. 2 is a perspective view of my device with the jaws open.

Fig. 3 is a perspective view of my device.

Fig. 4 is a perspective view of a modified form of my device.

Fig. 5 is a modified form of my device.

The same reference characters denote like parts in each of the several figures of the drawings. Referring to the drawings, A, designates a single length of wire which is shaped, bent or constructed into the parallel jaw members 2.2, each having therein a curved recess 3.3. The wire material after forming the jaw members 2.2 projects into the bent lever members 4.4 and is again bent into a coiled spring formation 5 and in which formation the lever members 4.4 are held apart by the two inwardly projecting vertical stems or pin shanks 6.6, which stems are adapted to pierce or penetrate the moss or other structural base of the wreath or other ornamental formation to be constructed. The projecting stems or pin shanks 6.6 are so bent in position as to rest between the lever members 4.4; the bent lever members 4.4 projecting back from the jaw members 2.2 are held apart in open formation and in resilient pressure against the stems 6.6, while the curved ends of the jaw members 2.2 are drawn together by the same pressure of the coiled spring 5 in closed formation, when in normal position, by the spring pressure from 5. The levers 4.4 are designed to be engaged by the thumb and forefinger so that the jaws 2.2 may be opened in order to insert the flower stem therein or release the flower stem therefrom. The jaws 2.2 are provided with indentations to hold the stem of the flower. The stems 6.6 while shown at some length in the drawing are designed to be cut to any desired length, according to the depth of the surface that they are to penetrate, whether moss or other subsurfaces, such as are commonly used in floral wreaths or funeral decorations.

In operation when a flower is cut or several flowers, while holding my device by the stems 6.6 in one hand, by the pressure of the thumb and finger with the other, the jaws 2.2 are opened and the stems of the flower or flowers inserted and then by releasing the levers 4.4 and the coiled spring 5, the flowers are firmly held in a vertical position, until released. The stems 6.6 are then pressed into the surface and the flower decoration is thus held in secure position as long as desired. Thus by the use of this simple device, groups of flowers or many flowers can be arranged and held firmly in position for decorative purposes.

Having thus described my invention what I claim as new and for which I desire Letters Patent is as follows:

In combination, a single length of spring steel wire formed about midway in a coiled spring and the equal and parallel ends projecting therefrom, for a space horizontally, then bent diagonally backward and upward for a space, then bent forward horizontally on a line with the extension from the coiled spring, then bent vertically downward, passing between the parallel extension sections extending from the coiled spring, and holding spaced apart in resilient pressure, the sections extending horizontally from the coiled spring, all for the purposes specified.

In testimony whereof I have affixed my signature.

WILLIAM F. SCHMEISKE.